May 28, 1957  E. L. POTTER, JR  2,793,889
PISTON ROD SEAL
Filed April 12, 1951
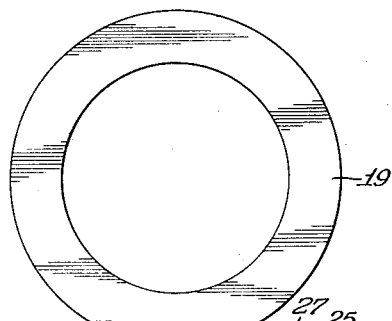
Fig.1
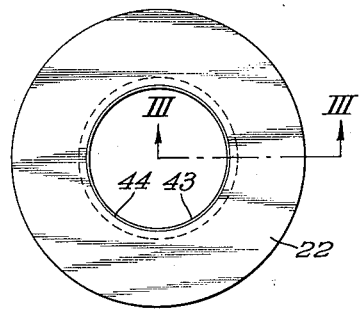
Fig.2
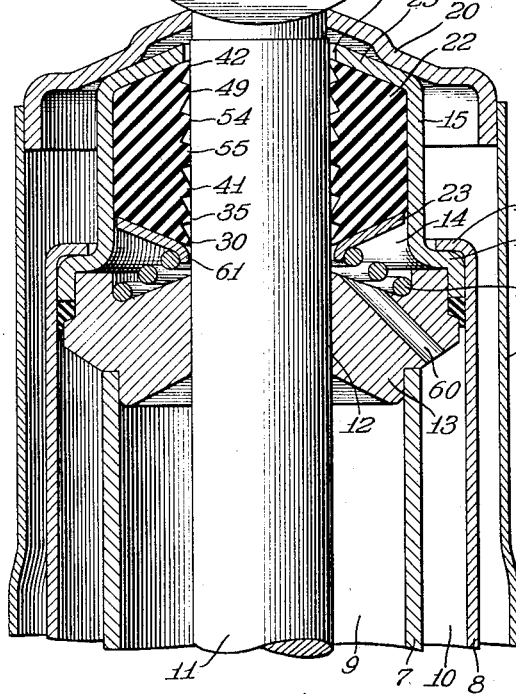
Fig.3
Fig.4
Inventor
Elbert Leland Potter, Jr.

United States Patent Office 2,793,889
Patented May 28, 1957

2,793,889

PISTON ROD SEAL

Elbert Leland Potter, Jr., Buffalo, N. Y., assignor to Houdaille Industries, Inc., Detroit, Mich., a corporation of Michigan Application April 12, 1951, Serial No. 220,626

1 Claim. (Cl. 288—2)

The present invention relates to improvements in direct acting shock absorbers, and more particularly concerns improvements in the means for sealing the shock absorber against escape of fluid from the interior of the shock absorber, or the entry of fluid into the shock absorber by way of the reciprocable piston rod.

An important object of the present invention is to provide a direct acting shock absorber having an improved fluid seal.

Another object of the invention is to provide an improved double acting fluid seal about the piston rod of a direct acting shock absorber.

A further object of the invention is to provide in a direct acting shock absorber means for not only effectively preventing escape of hydraulic fluid from the interior of the shock absorber, but also effectively excluding entry of water, or moisture into the shock absorber by way of the piston rod during operation of the shock absorber.

Still another object of the invention is to provide an improved piston rod fluid sealing structure.

Other objects, features and advantages of the present invention will be readily apparent from the following detailed description of a preferred embodiment thereof taken in conjunction with the accompanying drawings in which:

Figure 1 is a fragmentary vertical sectional view through the upper portion of a direct acting shock absorber embodying the present invention;

Figure 2 is an end view of the piston rod seal member;

Figure 3 is an enlarged transverse sectional view through the seal member taken substantially on the line III—III of Figure 2; and Figure 4 is an enlarged fragmentary sectional detail view taken in the same plane as Figure 3 and showing the upper end portion of the seal member in more explicit detail.

A direct acting hydraulic shock absorber embodying the invention comprises any preferred general construction comprising a cylinder tube 7 concentrically disposed within a larger reservoir tube, or casing member 8. Within the cylinder 7 is defined a pressure chamber 9 while between the cylinder 7 and the reservoir casing tube 8 is defined a reservoir chamber 10. Within the cylinder 7 is operable a valved piston (not shown) carried by a piston rod 11. The piston rod is reciprocable through a bearing aperture 12 in a bearing end cap member 13 which is secured upon the upper end of the cylinder 7. Above the bearing member 13 is provided a packing chamber 14 provided by a cap member 15 which has a marginal flange structure 17 seated upon the upper outer margin of the cap member 13 and secured thereto by a turned over flange 18 on the upper end of the reservoir tube 8. The upper outer end of the piston rod 11 has an attachment eye 19 thereon and carries a cap 20 to which is secured a dust shield tube 21 concentrically surrounding the reservoir tube 8 in spaced relation.

Within the packing chamber 14 provided above the bearing member 13 and substantially enclosed by the cap member, or shell 15 is a resilient rod seal member 22 against the lower end of which a generally frusto-conical pressure washer 23 bears under pressure from a coiled compression spring 24 seated on the bearing member 13.

As will be observed in Figure 1, the piston rod seal chamber shell, or casing member 15 is of generally cylindrical shape throughout the major body portion thereof and above the seating flange 17 and at its upper end is provided with a generally frusto-conical roof, or top portion 25 having a central aperture 27 which clears the piston rod 11 for free reciprocable movement therethrough. The reversely frusto-conical formation of the washer 23 and the top 25 and the complementary shape of the seal member 22 assures that under the compression of the spring 24 the seal member 22 will be squeezed into snug sealing engagement with the piston rod 11.

For operation of the shock absorber, the pressure chamber 9 is, of course, filled with hydraulic fluid. Some of this fluid is carried by the piston rod 11 out of the chamber 9 during outward, or protractional reciprocable movements of the piston rod through the bearing aperture, or bore 12. One of the functions of the rod seal member 22 is to prevent escape from the shock absorber unit of the hydraulic fluid transported by the piston rod 11 from the chamber 9. On the other hand, where the shock absorber is used under conditions of excessive moisture, or under water so that the piston rod 11 in its protracted condition receives moisture, or water thereon, means must be provided for preventing carrying of the moisture on the piston rod 11 into the shock absorber. As a matter of fact, it has been found that in shock absorbers equipped with ordinary rod seals intended to prevent escape of hydraulic fluid, but operated under conditions wherein the protracted piston rod is in contact with water, water is transported by the piston rod into the shock absorber.

According to the present invention, means are provided for preventing not only escape of hydraulic fluid from within the shock absorber, but also for preventing entry of liquid into the shock absorber in the reciprocations of the piston rod. To this end, the piston rod seal member 22, which is made from suitable resilient material such as rubber, or synthetic rubber, comprises not only a structure which is effective to wipe the piston rod 11 clean of hydraulic damping fluid during protractional movements of the piston rod 11, but also to wipe the piston rod clean of moisture, or water during retractional movements of the piston rod. Accordingly, the rod seal member 22 is constructed as a ring having the inner rod wiping diameter provided with a series of annular damping fluid wiper lips 28 on the inner end portion thereof, and a series of external fluid wiper lips 29 on the outer end portion thereof.

The series of internal hydraulic damping fluid wiper lips 28 comprises an annular end lip 30 (Figure 3) having a relatively sharp downwardly facing wiper lip edge 31 defined at its upper side by a narrow cylindrical wiping surface 32 from which recedes upwardly and outwardly a frusto-conical surface 33. The base of the surface 33 joins at a sharp angle with an oppositely frusto-conical annular face 34 providing the lower side of a succeeding annular wiper lip member 35 having a downwardly relatively sharp wiper lip edge 37. Extending upwardly from the lip edge 37 is a cylindrical annular surface 38 which merges on a radius 39 with a frusto-conical surface 40 extending upwardly and outwardly from the radius 39. The base of the surface 40 joins the lower face of a third wiper lip 41 of the series 28 which is preferably in all respects identical in structure with the wiper lip member 35. In a practical form, the lower face of the end lip 30 may be normal to the axis of the wiper ring seal member 22 while the lip faces 34 of the wiper lips 35 and 41 may be at an angle of approximately 15° to respective diametrical planes through the seal ring, and the upper, or back side faces 33 and 40 of the respective lips may be disposed approximately 30° to the axis of the seal ring. As a result, quite effective wiping of the internal hydraulic fluid from the protractionally moving piston rod 11 is accomplished while upon retractional movement of the rod any of the fluid collected in the annular spaces between the lips of the series 28 is carried back by the piston rod into the shock absorber past the upper shoulders of the lips.

The series of moisture and water excluding lips 29 is preferably constructed similarly as the hydraulic fluid escape preventing lips 28. To this end, the series of moisture excluding lips 29 comprises an upper end wiper lip 42 having a relatively sharp upwardly facing wiping edge 43 and a flat annular upwardly directed face 44 (Figures 3 and 4). Extending downwardly from the wiper edge 43 is a cylindrical wiping face 45 which merges with a downwardly and outwardly tapering frusto-conical lower face 47 of the upper end wiping lip 42. At its base the lip face 47 merges at a relatively sharp angle with an obtusely angular frusto-conical downwardly and inwardly directed annular upper face 48 of a succeeding wiper lip 49 having an upwardly directed relatively sharp wiper edge 50 at juncture of the upper face 48 with a preferably cylindrical downwardly extending wiper face 51. A radius juncture 52 at the lower end of the wiper face 51 effects merger with a downwardly and outwardly preferably frusto-conical lower face 53 of the wiper lip 49. There is preferably a second lower wiper lip 54 of substantially identical construction to the wiper lip 49. In a practical form satisfactory results have been attained by having the lower lip faces 47 and 53 of the moisture excluding lips disposed at approximately 30° to the axis of the sealing ring 22 while the upper faces 48 of the wiper lips 49 and 54 have been satisfactory at approximately 15° to respective diametrical planes through the ring 22.

The series of moisture excluding wiping lips 29 is quite effective to wipe the piston rod 11 clean of moisture, or other fluid thereon during retractional or inward movements of the piston rod. Moisture that is wiped from the piston rod and collects in the annular grooves between the outwardly inclined wiper lips is carried out upon protractional, or outward movements of the piston rod past the lower shoulders of the wiper lips in the series 29.

Further assurance against outward escape of fluid past the inward inclined fluid retaining wiper lips 28, or entry past the fluid excluding outwardly directed wiper lips 29, is provided by an intermediate wiper lip 55 which has a downwardly or inwardly directed fluid retaining safety wiper edge 57 and an upwardly directed fluid excluding safety wiper edge 58, both engaging the piston rod 11, while a cylindrical, rod-engaging wiper face 59 of substantial width extends between the wiper edges 57 and 58.

In order to accommodate the substantial length of the rod sealing ring 22, the length of the housing shell member 15 is appropriately extended as evident in Figure 1.

Return of internal hydraulic fluid to the packing chamber 14 for drainage through a drain passage 60 into the reservoir 10 is facilitated by having substantial clearance between the piston rod 11 and an inner marginal down turned central aperture defining lip 61 on the pressure washer 23. Thereby fluid captured by the inwardly directed set of wiper lips 28 during protraction of the piston rod 11 will easily return with the rod during retraction movement and during which movement the wiper lips in the series 28 relax and facilitate return drainage of the internal hydraulic fluid.

Similarly, by having the rod clearing aperture 27 of substantially larger diameter than the diameter of the rod, as best seen in Figure 1, expulsion of moisture captured by the outwardly directed set of wiper lips 29 during retractional movements of the piston rod will be facilitated during the protractional movements of the piston rod and consequent relaxing of the outwardly directed set of moisture-intrusion preventing wiper lips 29.

It will be understood, of course, that the fully retracted relationship of the piston rod 11 shown in Figure 1 is the condition attained during full telescoping, or collapsing of the shock absorber for storage or shipment purposes, and that during normal operative relationship of the shock absorber in assembly with relatively movable components of a structure such as an automobile, where the casing portion of the shock absorber is attached to the unsprung portion of the chassis and the piston rod is attached to the sprung portion of the chassis, the piston rod 11 will be in approximately half protracted relation to the casing portion of the shock absorber.

It will be understood that modifications and variations may be effected without departing from the scope of the novel concepts of the present invention.

I claim as my invention:

In a direct acting shock absorber piston rod seal, a resilient ring member having an internal surface including a radially inwardly projecting wiper lip having a radially inner generally axially extending and cylindrical rod-engaging wiper face, the lip having an annular generally radially extending face junctioning at a relatively steep angle with one axial margin of the generally cylindrical rod-engaging wiper face to provide a sharp wiping edge, and the lip having an annular face extending from the opposite axial margin of the rod-engaging wiper face and sloping generally radially and axially outwardly therefrom at an angle of approximately 30 degrees measured from the axial direction, said generally cylindrical wiper face and said sloping face being joined on an annular radius shoulder, the radius shoulder merging at its radially inner margin with said generally cylindrical wiper face and merging at its radially outer margin with said sloping face, said shoulder being of substantial arcuate length between said cylindrical wiper face and said sloping face in comparison to the length of said cylindrical wiper face.

References Cited in the file of this patent

UNITED STATES PATENTS

| Number | Name | Date |
|---|---|---|
| 1,287,285 | Gammeter | Dec. 10, 1918 |
| 2,182,034 | Van Oberstadt | Dec. 5, 1939 |
| 2,443,332 | Summers | June 15, 1948 |
| 2,517,717 | Rose | Aug. 8, 1950 |
| 2,537,425 | Rossman | Jan. 9, 1951 |
| 2,574,209 | Funkhouser | Nov. 6, 1951 |

FOREIGN PATENTS

| Number | Country | Date |
|---|---|---|
| 408,870 | Great Britain | Apr. 19, 1934 |